J. T. CORBETT.
CHAIN AND LINK THEREFOR.
APPLICATION FILED DEC. 17, 1908.

932,680.  Patented Aug. 31, 1909.

Witnesses
Benj. Finckel
Ada Gambs

Inventor
John T. Corbett
by Finaul Finaul
his Attorneys

UNITED STATES PATENT OFFICE.

JOHN T. CORBETT, OF COLUMBUS, OHIO.

CHAIN AND LINK THEREFOR.

932,680.

Specification of Letters Patent.

Patented Aug. 31, 1909.

Application filed December 17, 1908. Serial No. 468,061.

*To all whom it may concern:*

Be it known that I, JOHN T. CORBETT, a citizen of the United States, residing at Columbus, in the county of Franklin and State of Ohio, have invented a certain new and useful Improvement in Chains and Links therefor, of which the following is a specification.

The object of this invention is to provide a strong and inexpensive link especially adapted for the construction of small chain, such, for example, as is used in harness, log rolling &c.

The invention consists in the construction hereinafter described and claimed.

Figure 1:
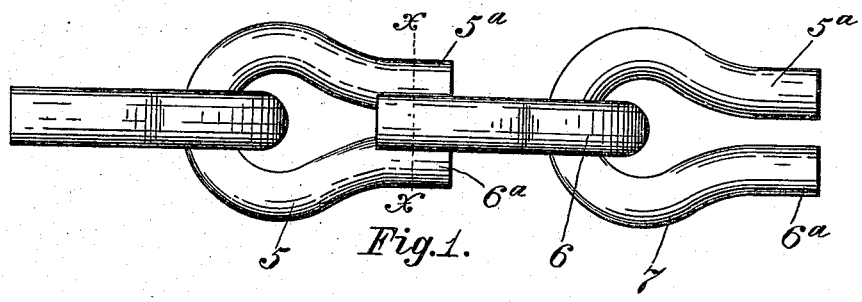
Figure 2:
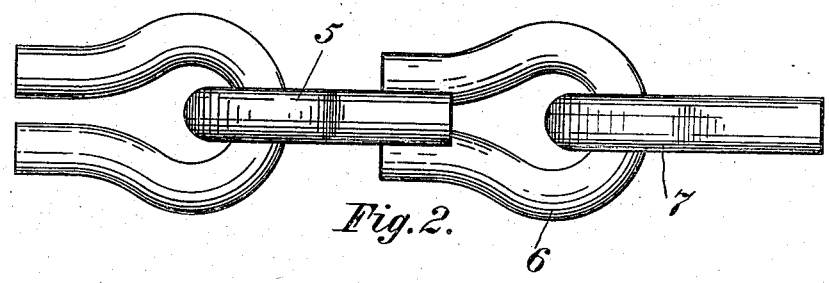
Figure 3:
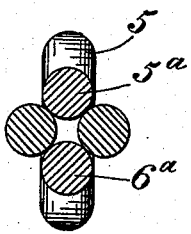
Figure 4:
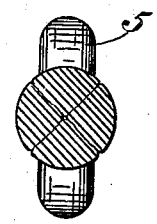

In the accompanying drawings—Figure 1 is a side elevation of one link and the parts of two. Fig. 2 is a similar view of the same, the links being rotated on their axis through a quadrant. Fig. 3 is a cross section through one link on the line $x$—$x$, Fig. 1, looking to the left, and Fig. 4 shows the parts of the section illustrated in Fig. 3, as the same might be welded and compressed.

The links, as indicated, are each made of two separate pieces of bar 5 and 6. Each of the said pieces is bent in its main portion to loop or pear shape in outline with substantially parallel terminal limbs, as seen at $5^a$ and $6^a$. To secure the two pieces together to form the link they are placed with their said parallel limbs lying interjacent, as clearly indicated in Figs. 1 to 3, and then heated at the limbs and welded by any suitable process or process and machinery. I propose to compress the limbs together so as to form a practically solid mass at the waist of the completed link, as indicated in Fig. 4, but a compression as great as that indicated is not necessary to secure a very strong connection. With this construction it will be observed that four contacting lines or surfaces are presented for the welding connection. In manufacturing a chain of this variety a piece or half of the link, according to one mode, is looped into the terminal or last added piece of the chain before the limbs are closed to such a position as indicated in Fig. 3, or according to another mode, the chain can be built up by merely welding together the limbs of preliminarily prepared looped pieces, such, for example, as indicated by the looped link sections 6 and 7, regarded separately.

In the form of link shown the planes of the link sections stand at right angles to each other, but I know of no reason why a twist could not be imparted to the waist of the link, or, indeed, to the body of the link section itself so that said sections shall stand with reference to each other otherwise than as shown.

What I claim and desire to secure by Letters Patent is:

A chain link constructed of two separate pieces of bar metal, each of which is bent to loop form with substantially parallel terminal portions, said terminal portions being parallelly interjacent and welded.

JOHN T. CORBETT.

Witnesses:
 BENJ. FINCKEL,
 ADA G. GAMBS.